United States Patent
Standifer

(10) Patent No.: US 11,634,187 B2
(45) Date of Patent: Apr. 25, 2023

(54) AUTOSLIDE FIFTH WHEEL HITCH

(71) Applicant: Ford Global Technologies, LLC, Dearborn, MI (US)

(72) Inventor: Cliff Standifer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 207 days.

(21) Appl. No.: 17/081,819

(22) Filed: Oct. 27, 2020

(65) Prior Publication Data
US 2022/0126933 A1  Apr. 28, 2022

(51) Int. Cl.
*B62D 53/08* (2006.01)

(52) U.S. Cl.
CPC ................. *B62D 53/0814* (2013.01)

(58) Field of Classification Search
CPC .................................................. B62D 53/0814
USPC ....................................................... 280/438.1
See application file for complete search history.

(56) References Cited

U.S. PATENT DOCUMENTS

| | | | |
|---|---|---|---|
| 6,308,977 B1 * | 10/2001 | Pulliam | B62D 53/0828 280/441 |
| 7,490,846 B2 | 2/2009 | Kaun | |
| 7,506,886 B2 | 3/2009 | Warnock | |
| 7,753,392 B2 | 7/2010 | Warnock | |
| 8,342,558 B1 | 1/2013 | Su | |
| 9,550,398 B2 | 1/2017 | Kraai | |
| 2007/0187925 A1 | 8/2007 | Lindeman et al. | |
| 2020/0039588 A1 | 2/2020 | Standifer | |

* cited by examiner

*Primary Examiner* — Kevin Hurley
*Assistant Examiner* — Felicia L. Brittman
(74) *Attorney, Agent, or Firm* — Lorne Forsythe; Hanley Flight & Zimmerman LLC

(57) ABSTRACT

An example trailer hitch is disclosed. The example trailer hitch includes a trailer hitch including a base to be coupled to a vehicle bed of a vehicle, a carriage slidably coupled to the base, the carriage to slide along rails of the base between a first position and a second position, and a head rotatably coupled to the carriage, the carriage to slide from the first position to the second position in response to rotation of the head.

21 Claims, 11 Drawing Sheets

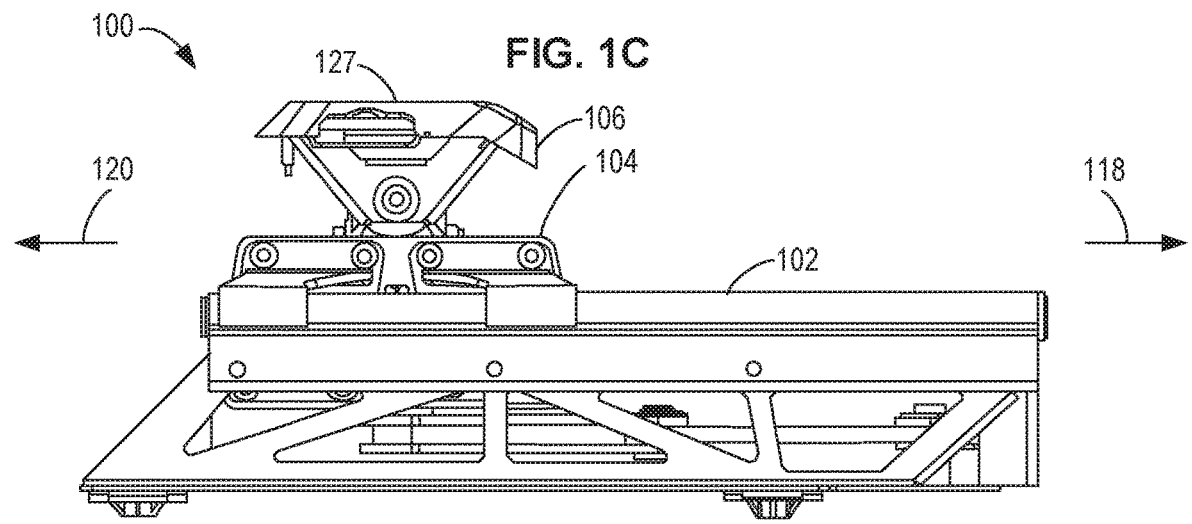
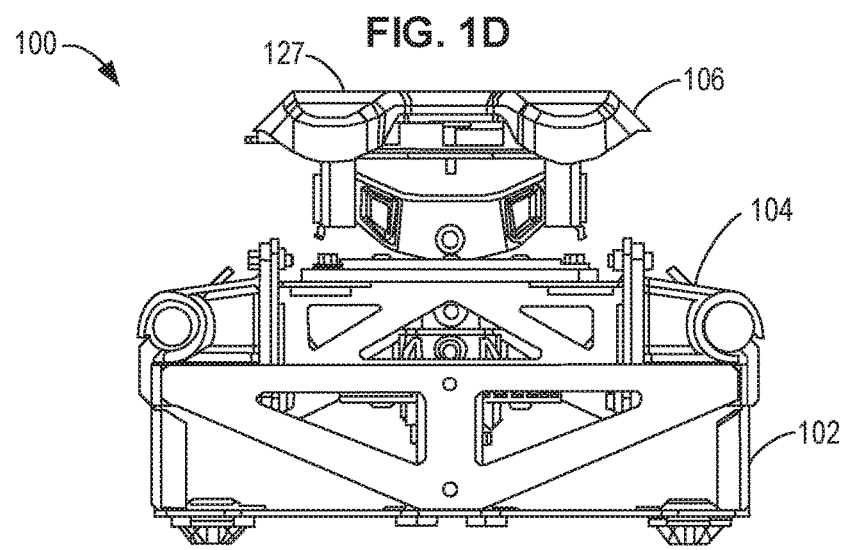

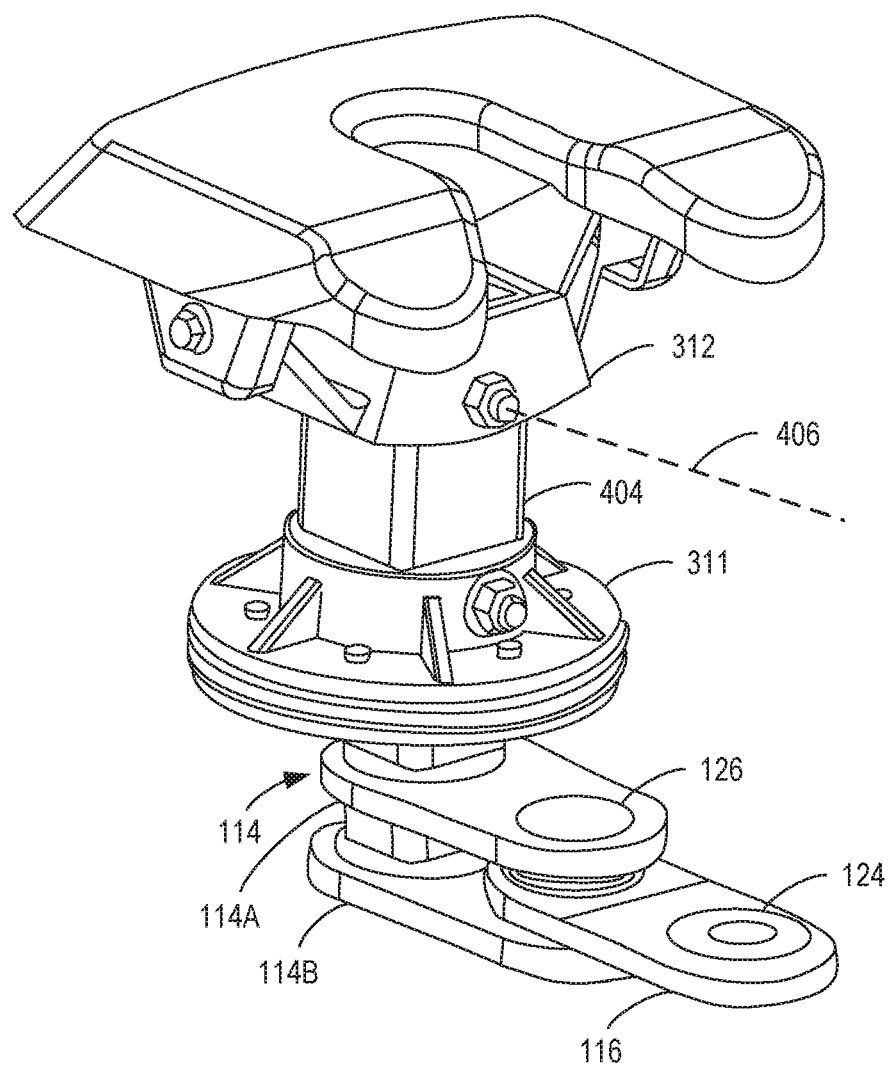

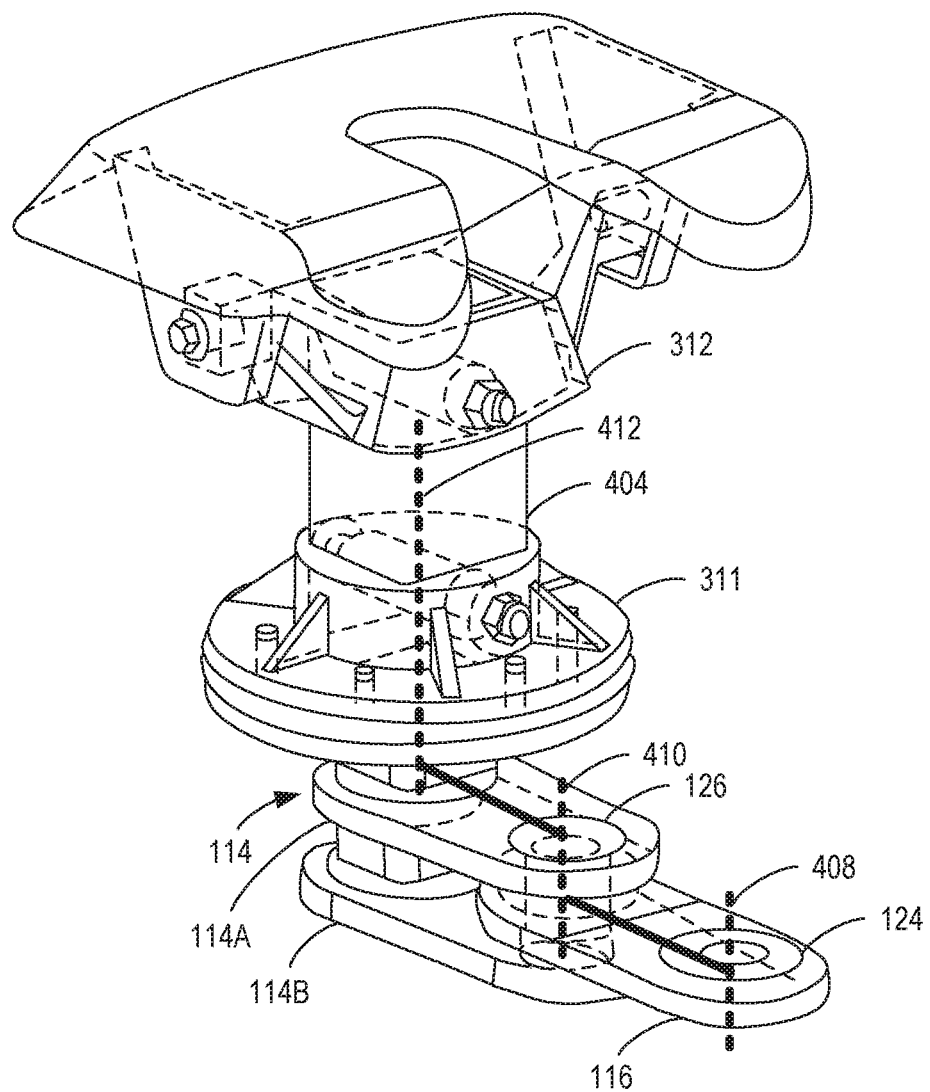

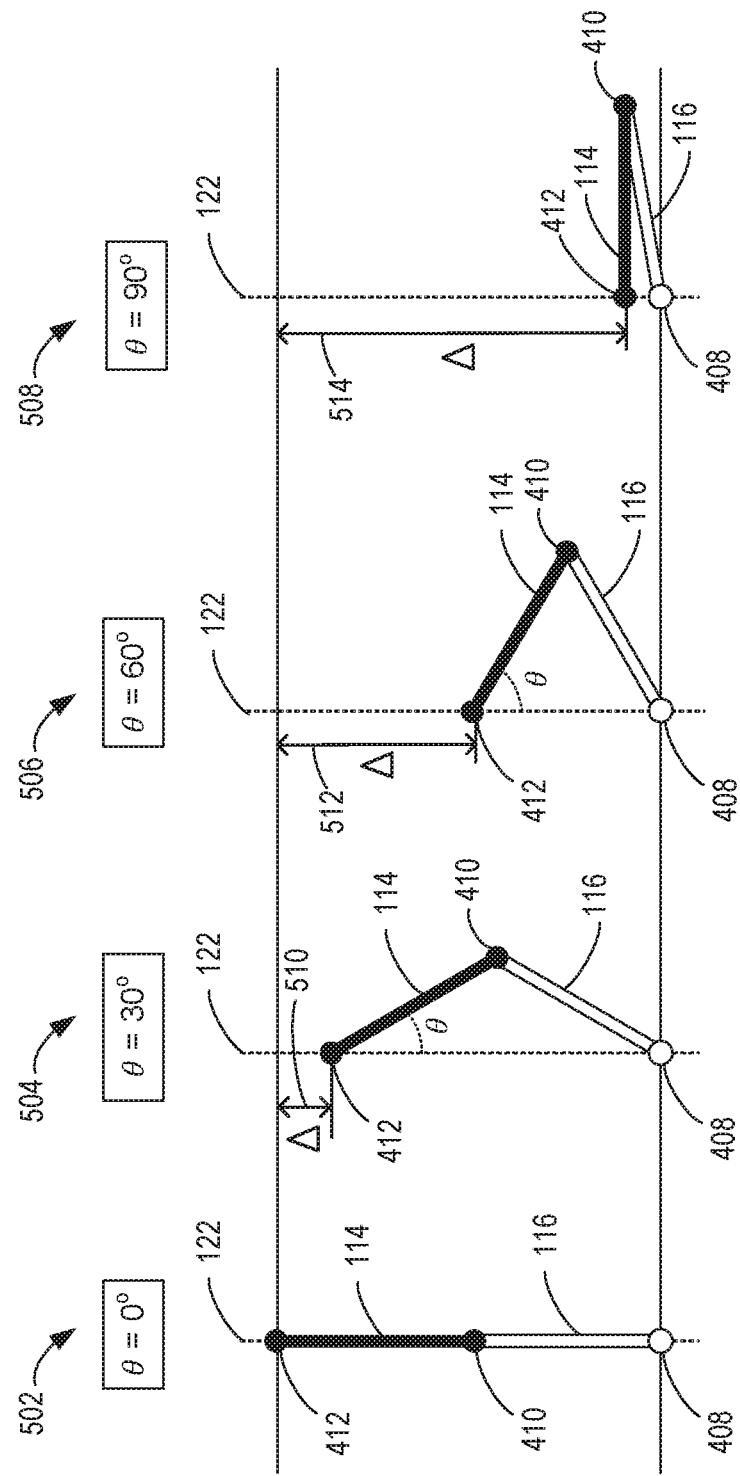

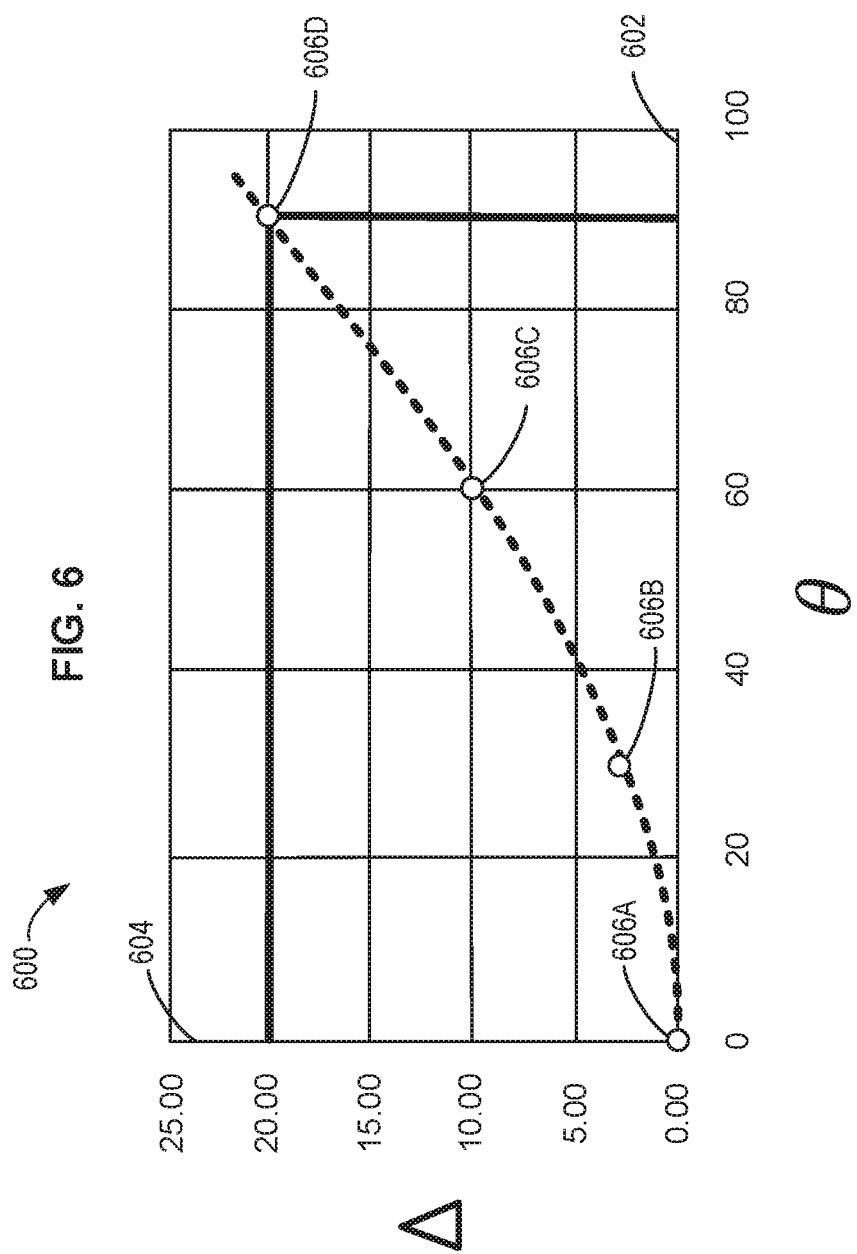

AUTOSLIDE FIFTH WHEEL HITCH

FIELD OF THE DISCLOSURE

This disclosure relates generally to vehicles, and, more particularly, to an autoslide fifth wheel hitch.

BACKGROUND

A trailer hitch is used to couple a trailer to a vehicle. Typically, the trailer hitch is coupled to a bed of the vehicle and further coupled to the trailer. The trailer hitch can rotate and/or travel rearward so that the trailer can avoid collision with the vehicle during turning of the vehicle.

SUMMARY

A first example trailer hitch includes a base to be coupled to a vehicle bed of a vehicle, a carriage slidably coupled to the base, the carriage to slide along rails of the base between a first position and a second position, and a head rotatably coupled to the carriage, the carriage to slide from the first position to the second position in response to rotation of the head.

A second example trailer hitch includes a fixed component including cylindrical guides, the fixed component to be coupled to a vehicle bed, a sliding component including arms slidably coupled to the cylindrical guides, the sliding component to slide between a first position and a second position along the cylindrical guides, and a rotating component coupled to the sliding component, the rotating component to slide with and rotate with respect to the sliding component, the sliding component and the rotating component to slide along the fixed component in response to a rotation of the rotating component.

A third example trailer hitch includes a fixed base, a carriage slidably coupled to the fixed base, a head rotatably coupled to the carriage, the carriage to slide along the fixed base in response to a rotation of the head, and a linkage including a first link coupled to the fixed base at a first pin joint, and a second link coupled to the first link at a second pin joint and further coupled to the head, the rotation of the head to generate an angular displacement between the first link and the second link at the second pin joint, the angular displacement corresponding to a distance traveled by the carriage along the fixed base.

BRIEF DESCRIPTION OF THE DRAWINGS

FIG. 1C illustrates a side view of the example trailer hitch of FIGS. 1A and/or 1B.

FIG. 1D illustrates a front view of the example trailer hitch of FIGS. 1A, 1B, and/or 1C.

FIG. 4A illustrates an example head of the example trailer hitch of FIGS. 1A, 1B, 1C, and/or 1D including an example column, an example lower slew ring, an example lever, and an example link.

FIG. 4B illustrates a perspective view of the example head of FIG. 4A including the example column, the example lower slew ring, the example lever, and the example link of FIG. 4A.

FIG. 5 is a diagram illustrating configurations of the example head of FIGS. 4A and/or 4B at different values of angular displacement.

FIG. 6 is a graph illustrating linear displacement of the example carriage of FIGS. 3A, 3B, 3C and/or 3D with respect to angular displacement of the example head of FIGS. 4A and/or 4B.

Figure 1A:
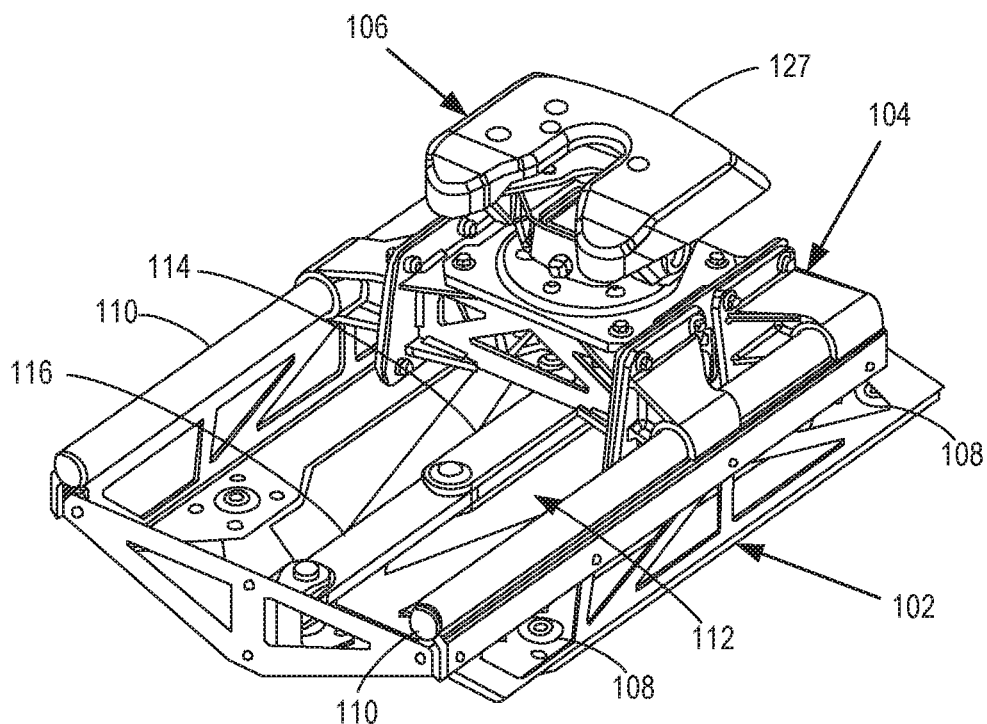
FIG. 1A illustrates an example trailer hitch in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A trailer hitch (e.g., fifth wheel hitch) is typically used to couple a trailer to a vehicle (e.g., truck). A trailer hitch can include a base coupled to a vehicle bed and a head to be coupled to the trailer. As the vehicle turns, rotation of the head allows the trailer to turn with the vehicle. In some cases, sharp turns (e.g., 90 degree turns) made by the vehicle can cause a collision to occur between a cab of the vehicle and the trailer. This problem is particularly common for short bed trucks, where the vehicle bed has a substantially shorter length compared to a typical truck bed (e.g., having a length of 8 ft) and, as such, a clearance between the trailer and the vehicle cab is reduced.

To maintain vehicle performance, weight from the trailer can be distributed on a location of the vehicle bed that is positioned directly above and/or slightly forward of a rear axle of the vehicle. As such, a trailer hitch is typically positioned at such a location of the vehicle bed. In short bed trucks, positioning of the trailer hitch proximate the rear axle provides insufficient clearance between the vehicle cab and the trailer during sharp turns. To increase the clearance, some trailer hitches allow a user operating the vehicle to manually shift the trailer hitch rearward during turning. However, such trailer hitches can be inconvenient for the user by requiring additional input from the user while driving. Alternatively, other existing trailer hitches can automatically shift rearward during turns by implementing cams and rollers to control fore-aft motion of the trailer hitch. Such existing automatic trailer hitches can face long-term performance and durability issues resulting from wear of the cams and rollers.

Rollers implemented on an automatic trailer hitch require a clearance (e.g. gap) on an opposite side of a touching surface to allow rotation of the rollers. When the automatic trailer hitch is subjected to fore-aft motion under large loads, the rollers can generate excessive noise and/or vibration due to gapping and, in some cases, can fail due to impact loading from the trailer. Furthermore, the use of a cam mechanism can also lead to failure of the automatic hitch trailer due to jamming of the cam mechanism during fore-aft motion. Inaccuracies in manufacturing of the cam can reduce smoothness of travel of the trailer hitch, resulting in galling and/or deformation of the cam and/or other trailer hitch components. Galling of the cam can be further exacerbated due to inadequate lubrication of the cam mechanism.

Additionally, loads are transmitted to a cam roller and/or to a center pin of the cam mechanism during cyclical travel of the trailer hitch, and such loads can cause shearing and/or failure of the cam roller and/or center pin.

Examples disclosed herein couple a trailer to a vehicle and increase a clearance between the trailer and the vehicle during turning of the vehicle without the use of cams and rollers. An example trailer hitch (e.g., fifth wheel hitch, autoslide trailer hitch) disclosed herein implements linear guides instead of rollers to slide a carriage forward and rearward along a base coupled to the vehicle bed. Advantageously, the linear guides can be self-lubricating, corrosion resistant, dirt resistant, lightweight, easily replaceable, and/or manufactured with high precision. Furthermore, examples disclosed herein implement a linkage instead of a cam mechanism to convert rotation of a head to linear travel of the trailer hitch assembly. Precise manufacturing of the holes and pins of the linkage can reduce gapping and, in turn, produce smooth travel of the trailer hitch assembly.

FIG. 1A illustrates an example trailer hitch 100 in accordance with teachings of this disclosure. The example trailer hitch 100 includes a fixed component, a sliding component, and a rotating component. In particular, the example trailer hitch 100 includes an example base 102, an example carriage 104, and an example head 106. In the illustrated example of FIG. 1A, the base 102 is fixedly couplable to a vehicle bed (e.g., truck bed) via anchor bushings 108, such that the base 102 is a fixed component on the vehicle bed. The example carriage 104 is slidably coupled to rails 110 of the base 102 to slide forward and rearward along the base 102, such that the carriage 104 is a sliding component along the fixed component of the base 102. Furthermore, the head 106 is coupled to the carriage 104 so that the head 106 can slide with and rotate with respect to the carriage 104, where the head 106 is a rotating component of the trailer hitch 100. The head 106 is further coupled to the base 102 via an example linkage 112. The example linkage 112 further includes an example lever 114 coupled to the head 106, and an example link 116 coupled between the lever 114 and the base 102.

Figure 1B:
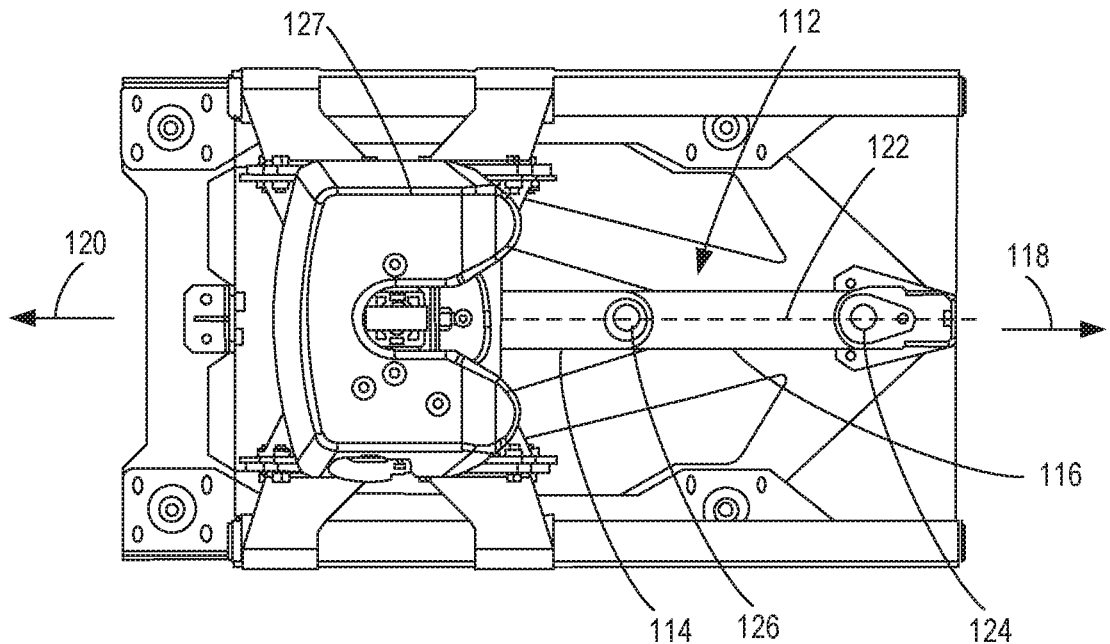
FIG. 1B illustrates a top view of the example trailer hitch of FIG. 1A.

FIGS. 1B, 1C, and 1D illustrate a top view, a side view, and a front view of the example trailer hitch 100 of FIG. 1A, respectively. The carriage 104 can travel rearward on the base 102 in an example rearward direction 118 of FIGS. 1B and/or 1C (e.g., out of the page in FIG. 1D). Furthermore, the carriage 104 can travel forward on the base 102 in an example forward direction 120 of FIGS. 1B and/or 1C (e.g., into the page in FIG. 1D). The carriage 104 moves away from a vehicle cab of the vehicle in the rearward direction 118 in response to turning of the vehicle to increase a clearance between the trailer and the vehicle cab, and the carriage 104 moves toward the vehicle cab in the forward direction 120 in response to completion of the turn (e.g., straightening out and/or realigning the trailer with respect to the vehicle).

In the illustrated examples of FIGS. 1A through 1D, the trailer hitch 100 is shown in a starting position, in which the linkage 112 is fully extended. For example, the lever 114 and the link 116 in the starting position are substantially parallel to and/or aligned with an example axis 122 in the illustrated example of FIG. 1B. In the starting position, the vehicle is not turning and the head 106 is oriented substantially parallel and/or aligned with the axis 122. Furthermore, the carriage 104 and the head 106 in the starting position are at a first linear position on the base 102 proximate the vehicle cab and/or above a rear axle of the vehicle. In the illustrated example of FIG. 1B, the link 116 is rotatably coupled to the base 102 at an example first pin joint 124 fixed to the base 102, and further rotatably coupled to the lever 114 at an example second pin joint 126. The head 106 is couplable to a trailer via an example top plate 127 such that the head 106 can rotate with the trailer. In some examples, the trailer can be coupled to the top plate 127 via a capture plate (not shown).

As the vehicle turns, the head 106 rotates with respect to the carriage 104. The lever 114 is fixedly coupled to the head 106 so that the lever 114 rotates with the head 106. In response to rotation of the head 106 from the starting position, rotation of the lever 114 results in an angular displacement between the lever 114 and the axis 122. At the same time, the lever 114 and the link 116 rotate with respect to one another about the second pin joint 126, and the link 116 further rotates about the first pin joint 124. As the lever 114 and the link 116 rotate, the linkage 112 pulls the carriage 104 in the rearward direction 118 along the base 102 to a second linear position. Thus, the head 106 and the attached trailer shift rearward relative to the vehicle bed, allowing the trailer to avoid a collision with the vehicle during turning of the vehicle.

As the vehicle completes the turn, the head 106 and the trailer return to an angular position that is substantially parallel to and/or aligned with the axis 122. Further, the linkage 112 rotates about the first pin joint 124 and the second pin joint 126 until the lever 114 and the link 116 are substantially realigned with each other and with the axis 122. This, the linkage 112 pushes the carriage 104 in the forward direction 120 on the base 102 until the carriage 104 returns to the first linear position proximate the vehicle cab.

Figure 2A:
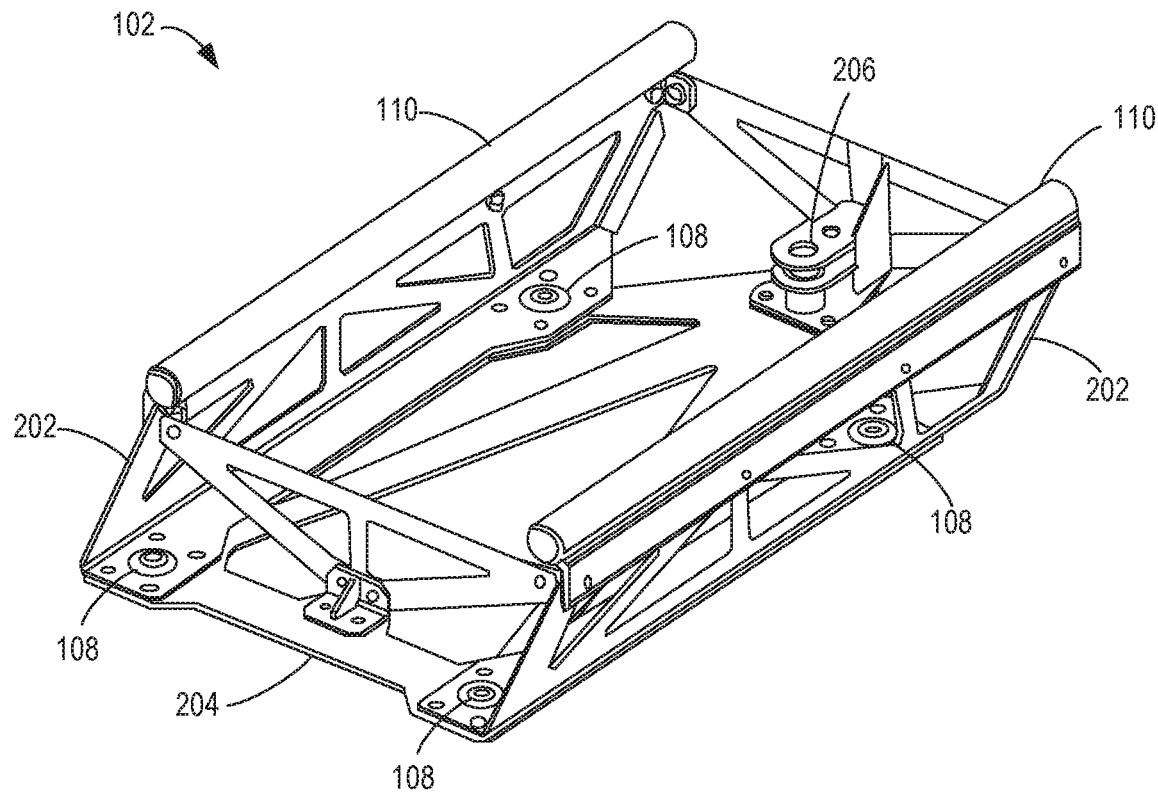
FIG. 2A illustrates an example base of the example trailer hitch of FIGS. 1A, 1B, 1C, and/or 1D.

FIG. 2A illustrates the example base 102 of the example trailer hitch 100 of FIGS. 1A, 1B, 1C, and/or 1D. The base 102 includes the example rails 110 of FIG. 1A mounted on example support trusses 202. The support trusses 202 are further coupled to an example plate 204 via the anchor bushings 108. In some examples, the anchor bushings 108 fixedly couple the support trusses 202 to the plate 204, and further fixedly couple the support trusses 202 and the plate 204 to a vehicle bed. In the illustrated example of FIG. 2A, four of the example anchor bushings 108 are used. In other examples, any number of the example anchor bushings 108 may be used. In the illustrated example of FIG. 2A, the support trusses 202 and the plate 204 include multiple cutouts. However, in some examples, the support trusses 202 and/or the plate 204 can be a solid piece of material.

Figure 2B:
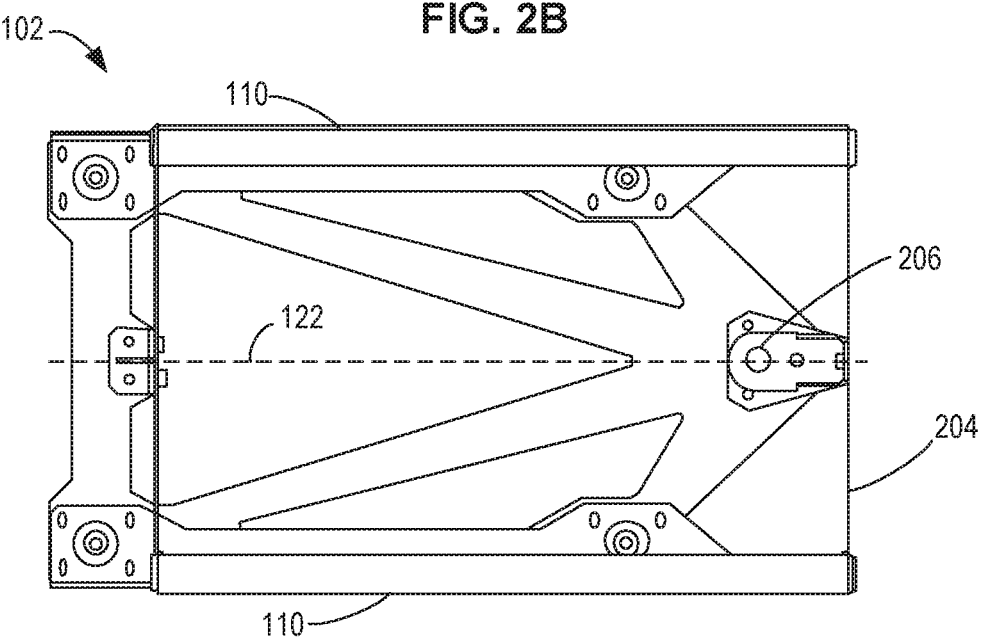
FIG. 2B illustrates a top view of the example base of FIG. 2A.
Figure 2C:
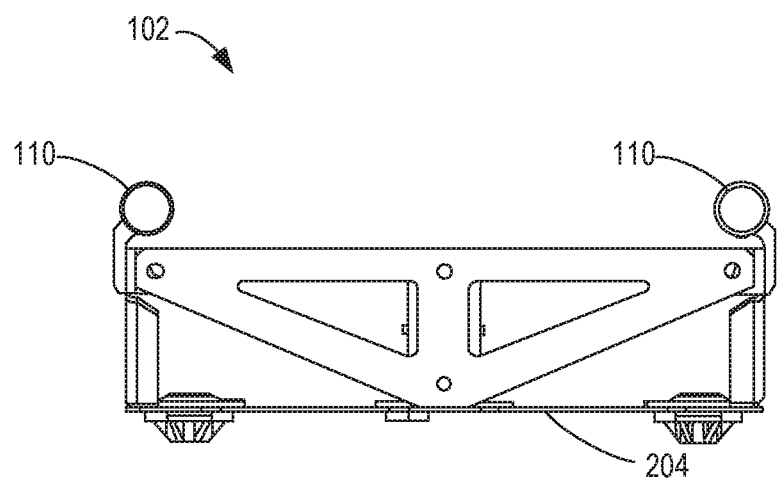
FIG. 2C illustrates a front view of the example base of FIGS. 2A and/or 2B.
Figure 2D:
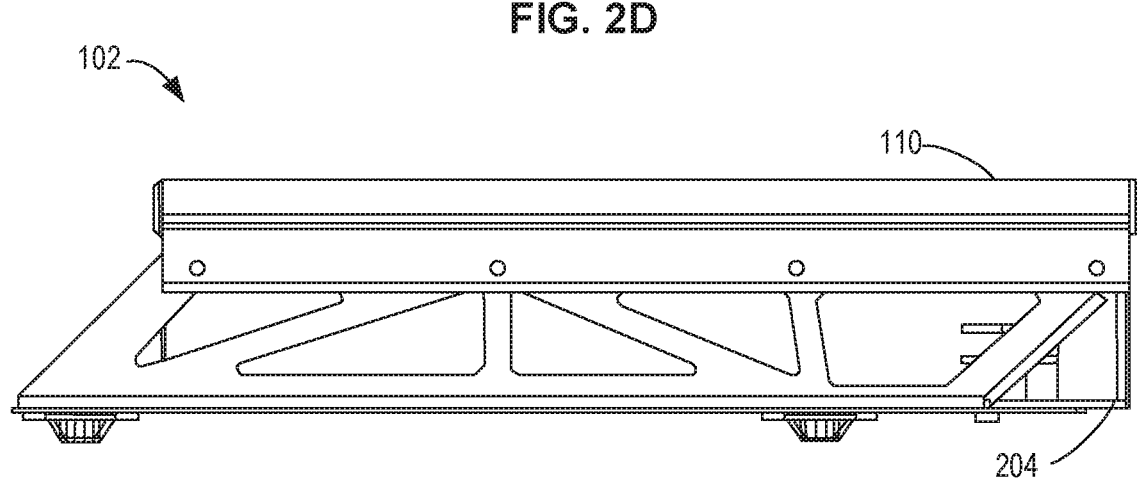
FIG. 2D illustrates a side view of the example base of FIGS. 2A, 2B, and/or 2C.

FIGS. 2B, 2C, and 2D illustrate a top view, a front view, and a side view of the example base 102 of FIG. 2A, respectively. In the illustrated examples of FIGS. 2A-2D, the rails 110 are cylindrical with circular cross-sections. In other examples, a different cross-section (e.g., hexagonal, octagonal, elliptical, etc.) of the rails 110 can be used. In some examples, the rails 110 are mounted opposite ends of the plate 204 and are substantially parallel to the example axis 122 of FIGS. 1B and/or 2B. A length of the rails 110 is at least the linear distance travelled by the carriage 104 of FIGS. 1A-1D during turning of the vehicle. In the illustrated examples of FIGS. 2A and/or 2B, the base 102 includes an example pin support 206 proximate a rear end of the base 102. The first pin joint 124 of the example link 116 of FIGS. 1A and/or 1B is coupled to the pin support 206. As such, the link 116 is rotatable about the first pin joint 124 that is fixed to the base 102 via the pin support 206.

Figure 3A:
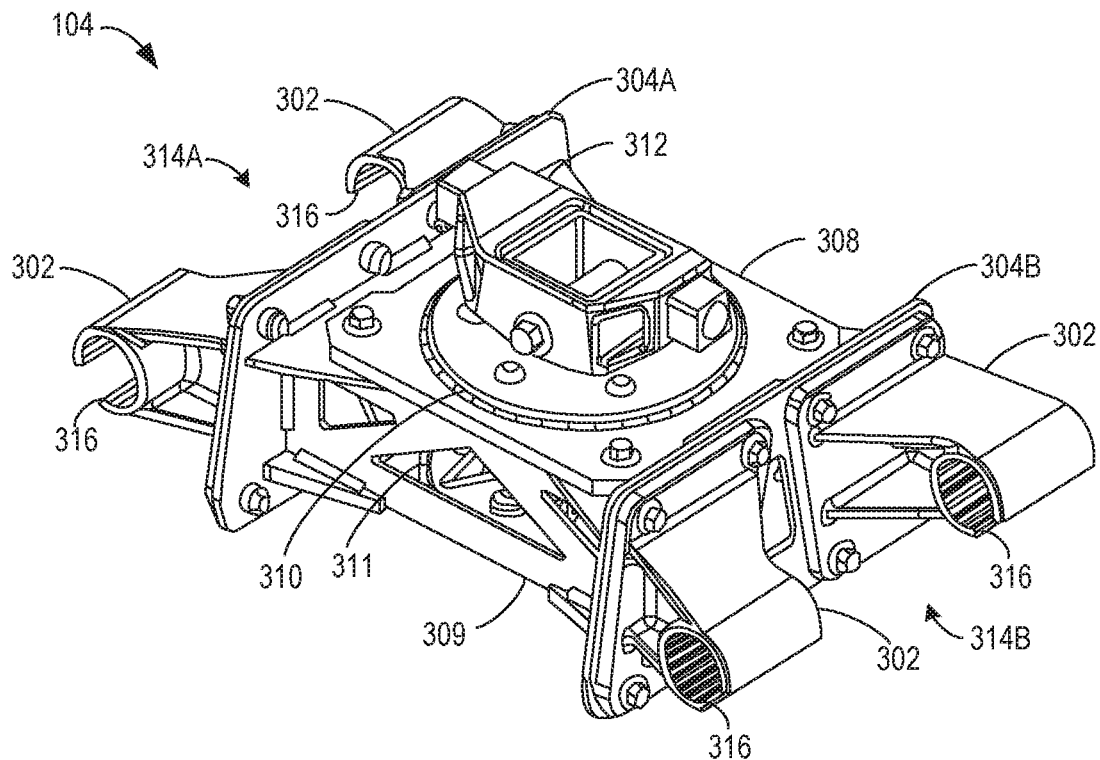
FIG. 3A illustrates an example carriage of the example trailer hitch of FIGS. 1A, 1B, 1C, and/or 1D.

FIG. 3A illustrates the example carriage 104 of the example trailer hitch 100 of FIGS. 1A, 1B, 1C, and/or 1D. The example carriage 104 of FIG. 3A includes example arms 302 coupled to example side plates 304A, 304B, where the slide plates 304A, 304B include an example first side plate 304A and an example second side plate 304B positioned on opposite sides of the carriage 104. In the illustrated example of FIG. 3A, the arms 302 are coupled to the side plates 304A, 304B via bolts. In other examples, the arms 302 are welded and/or otherwise fixed to the side plates 304A, 304B. The example carriage 104 further includes an example top plate 308 and an example bottom plate 309 coupled between the side plates 304A, 304B. The example top plate 308 includes an opening centrally positioned on the top plate 308 in which an example upper slew ring 310 is implemented. Furthermore, the example bottom plate 309 includes an opening centrally positioned on the bottom plate 309 in which an example lower slew ring 311 is implemented. In such examples, the upper slew ring 310 rotates with respect to the top plate 308 and the lower slew ring 311 rotates with respect to the bottom plate 309. In the illustrated example of FIG. 3A, the upper slew ring 310 is further coupled to an example pivot beam 312 of the example head 106 of FIG. 1A. In such examples, the pivot beam 312 and the head 106 rotate with the upper slew ring 310.

Figure 3B:
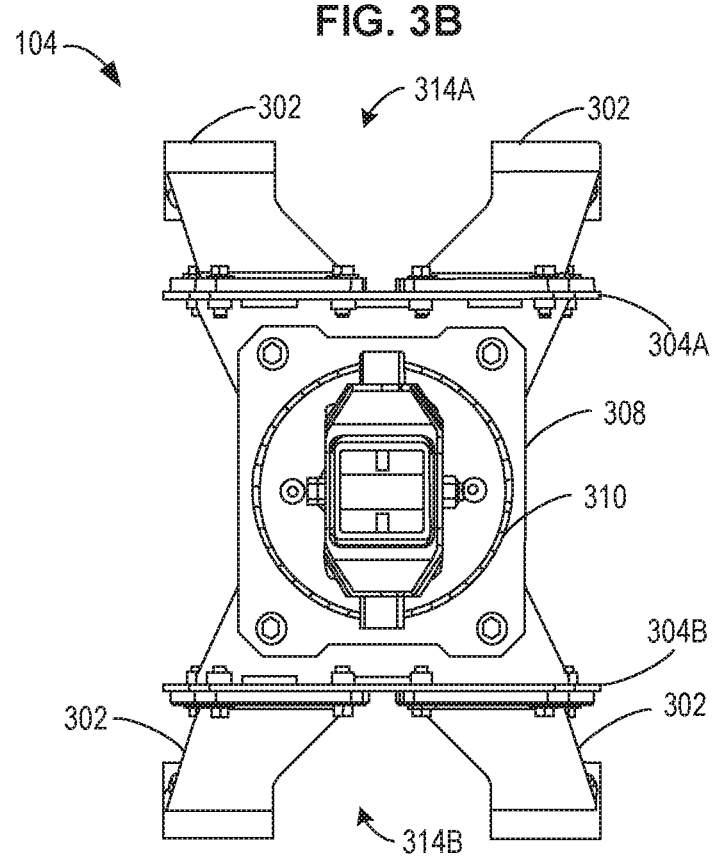
FIG. 3B illustrates a top view of the example carriage of FIG. 3A.
Figure 3C:
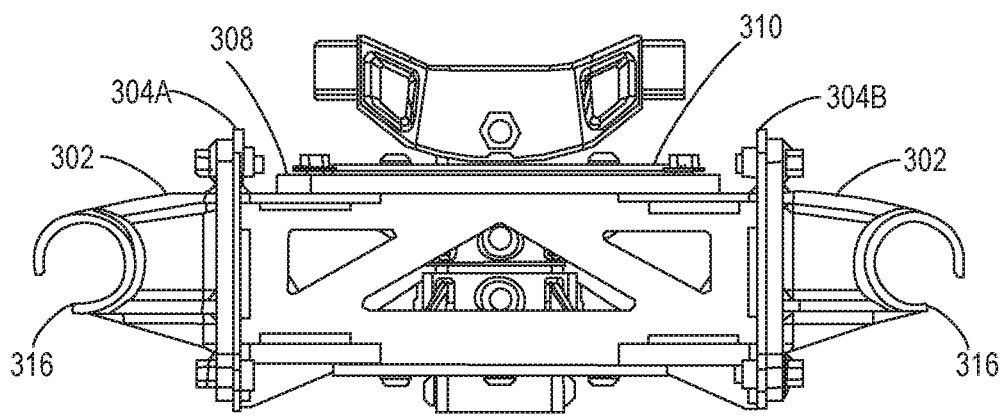
FIG. 3C illustrates a front view of the example carriage of FIGS. 3A and/or 3B.
Figure 3D:
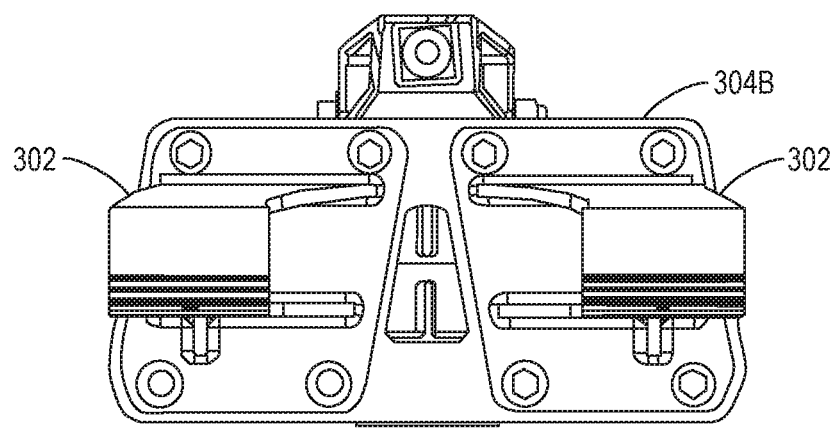
FIG. 3D illustrates a side view of the example carriage of FIGS. 3A, 3B, and/or 3C.

FIGS. 3B, 3C, and 3D illustrate a top view, a front view, and a side view of the example carriage 104 of FIG. 3A, respectively. In the illustrated examples of FIGS. 3A-3D, the carriage 104 includes four of the arms 302, with an example first arm pair 314A of the arms 302 positioned on a the first side plate 304A and a second arm pair 314B of the arms 302 positioned on the second side plate 304B. In some examples, the carriage 104 can include a different number of the arms 302 coupled to the side plates 304A, 304B. In the illustrated example of FIGS. 3A-3D, the arms 302 include rounded portions (e.g., tubes, sleeves) 316. The rounded portions 316 are couplable to the rails 110 of FIGS. 1A, and/or 2A-2D such that the rounded portions 316 are slidable along the rails 110. In such examples, the rounded portions 316 wrap around a partial circumference of the rails 110. In some examples, the carriage 104 includes bearings coupled between the rounded portions 316 and the rails 110 to reduce friction and provide smooth motion of the carriage 104 along the base 102. Additionally or alternatively, the example carriage 104 can include bearings between the upper slew ring 310 and the top plate 308 and/or between the lower slew ring 311 and the bottom plate 309. The bearings can allow smooth rotation of the upper slew ring 310 and/or the lower slew ring 311. In some examples, the bearings can be a plastic material.

FIG. 4A illustrates the example head 106 of the example trailer hitch 100 of FIGS. 1A, 1B, 1C, and/or 1D. The example head 106 of FIG. 4A includes the example pivot beam 312 of FIG. 3A, an example column 404 coupled to the pivot beam 312, and the example lower slew ring 311 of FIG. 3A coupled to the column 404 via one or more bolts. The head 106 is couplable to a trailer. For example, a pin box of the trailer is coupled to the head 106 via the top plate 127 of FIGS. 1A-1D such that, in response to a rotation of the trailer with respect to the vehicle, the head 106 rotates with the trailer.

In the illustrated example of FIG. 4A, the pivot beam 312 can pivot side to side with respect to the column 404. For example, the pivot beam 312 allows the top plate 127 to pivot and/or otherwise pitch in response to the vehicle and/or the trailer driving over rough and/or uneven terrain. As such, the pivot beam 312 allows the trailer to remain coupled to the trailer hitch 100 and/or avoid damage to the trailer hitch 100 and/or the trailer in the case of rough and/or uneven terrain. In some examples, the pivot beam 312 can pivot up to approximately 5 degrees clockwise and/or counterclockwise about an example pivot axis 406. In other examples, the pivot beam 312 can be configured to pivot to a different angle about the pivot axis 406 (e.g., ±8 degrees, ±10 degrees, etc.) In some examples, the lower slew ring 311 is configured to transmit a load from the trailer to the carriage 104, and the upper slew ring 310 of FIGS. 3A and/or 3B is configured to stabilize the column 404.

In FIG. 4A, the example head 106 further includes the lever 114 of FIGS. 1A and/or 1B fixedly coupled to the column 404 such that the lever 114 rotates with the column 404 in response to rotation of the attached trailer. Furthermore, the link 116 of FIGS. 1A and/or 1B is rotatably coupled to the lever 114 at the second pin joint 126 and rotatably coupled to the pin support 206 of FIGS. 2A and/or 2B at the first pin joint 124. While the first pin joint 124 is fixed at a position of the pin support 206, the second pin joint 126 has a variable position corresponding to an angle of rotation of the lever 114.

In the illustrated example of FIG. 4A, the second pin joint 126 is implemented as a double lap joint, such that the link 116 is rotatable about the second pin joint 126 between an example top portion 114A and an example bottom portion 114B of the lever 114. In such examples, the double lap joint prevents overlapping of the lever 114 and the link 116 during sharp turns of the vehicle (e.g., 90 degree turns). In some examples, the head 106 can include a travel limiter (not shown) to limit and/or otherwise restrict travel of the carriage 104. For example, the travel limiter can restrict rotation of the link 116 to a threshold angle of rotation (e.g., 89 degrees). For examples in which the rotation of the link 116 is greater than 90 degrees, undesired travel of the carriage 104 in the rearward direction 118 can occur. As such, the travel limiter can prevent travel of the carriage 104 in the rearward direction 118 during straightening out and/or realigning of the trailer with respect to the vehicle (e.g., during completion of a turn).

FIG. 4B illustrates a perspective view of the head 106 of FIG. 4A. In the illustrated example of FIG. 4B, the head 106 includes an example first axis (e.g., first pin joint axis) 408 through the first pin joint 124, an example second axis (e.g., second pin joint axis) 410 through the second pin joint 126, and an example third axis (e.g., column axis) 412 through the column 404. The example first axis 408 is at a fixed position, while positions of the second axis 410 and the third axis 412 can vary in response to rotation of the trailer. For example, in response to the vehicle making a right turn, the trailer causes the column 404 and/or the lever 114 to rotate counterclockwise about the third axis 412. In such examples, the link 116 rotates clockwise with respect to the second axis 410 and the first axis 408. Alternatively, in response to the vehicle making a left turn, the trailer causes the column 404 and/or the lever 114 to rotate clockwise about the third axis 412. In such examples, the link 116 rotates counterclockwise with respect to the second axis 410 and the first axis 408.

FIG. 5 is a diagram illustrating configurations of the example head of FIGS. 4A and/or 4B at different values of angular displacement of the lever 114 of FIGS. 4A and/or 4B. In the illustrated example of FIG. 5, an example first configuration 502 corresponds to an angular displacement of 0 degrees, an example second configuration 504 corresponds to an angular displacement of 30 degrees, an example third configuration 506 corresponds to an angular displacement of 60 degrees, and an example fourth configuration 508 corresponds to an angular displacement of 90 degrees. Each of the configurations 502, 504, 506, 508 includes the lever 114 and the link 116 of FIGS. 4A and/or 4B coupled between the first axis 408, the second axis 410, and/or the third axis 412 of FIG. 4B. In the illustrated example of FIG. 5, the first axis 408, the second axis 410, and the third axis 412 extend out of the page.

In the first configuration 502, the lever 114 and the link 116 are substantially aligned with the axis 122 of FIG. 1B. Furthermore, the first axis 408, the second axis 410, and the third axis 412 are colinear along the axis 122. As such, the example first configuration 502 at an angular displacement (e.g., θ) of 0 degrees corresponds to the trailer hitch 100 being in the starting position as described in connection with FIGS. 1A-1D above. For example, the trailer hitch 100 in the starting position corresponds to the vehicle and attached trailer being substantially aligned (e.g., the vehicle is not turning). The carriage 104 at the third axis 412 is at a starting linear position proximate the front of the vehicle bed such that the linear displacement (e.g., Δ) of the carriage 104 is approximately 0 inches while the vehicle is not turning.

As the vehicle begins to turn, the vehicle rotates with respect to the trailer at the trailer hitch 100. As such, the lever 114 and the link 116 can move from the first configuration 502 to the second configuration 504 in response to the turning of the vehicle. In the example second configuration 504, rotation of the trailer results in rotation of the lever 114 about the third axis 412. Rotation of the lever 114 in the second configuration 504 corresponds to an angular displacement of 30 degrees. In particular, the lever 114 rotates counterclockwise about the third axis 412 such that the displacement angle θ between the lever 114 and the axis 122 is 30 degrees. Accordingly, the second axis 410 moves to the right of the axis 122 such that the link 116 rotates clockwise about the first axis 408. Rotation of the link 116 about a fixed axis (e.g., the first axis 408) results in the lever 114 and the link 116 pulling the third axis 412 rearward toward the first axis 408. As such, the carriage 104 slides rearward along the rails 110 of the base 102, where the distance travelled corresponds to an example first linear displacement 510 of the carriage 104 along the axis 122 from a first linear position (e.g., the starting linear position) to a second linear position. In such examples, the linear displacement Δ is based on the angular displacement of the lever 114.

In response to further turning of the vehicle, the trailer hitch 100 may move from the second configuration 504 to the third configuration 506. In such examples, the trailer and/or the head 106 rotates to an angular displacement of approximately 60 degrees from the axis 122. The lever 114 rotates further counterclockwise about the third axis 412 by an additional 30 degrees compared to the second configuration 504 and, similarly, the link rotates further clockwise about the first axis 408 by an additional 30 degrees. In such examples, the lever 114 and the link 116 further pull the carriage 104 rearward along the base 102 from the second linear position to a third linear position along the axis 122. The distance travelled by the carriage 104 from the first linear position to the third linear position corresponds to an example second linear displacement 512 along the axis 122, where the second linear displacement 512 is larger than the first linear displacement 510.

In response to the vehicle making a full right turn (e.g., the vehicle rotates 90 degrees with respect to the trailer), the head 106 rotates with respect to the axis 122 such that the angular displacement between the lever 114 and the axis 122 is approximately 90 degrees. Similarly, the link 116 rotates clockwise about the first axis 408. As such, the lever 114 and the link 116 pull the carriage 104 rearward from the third linear position to a fourth linear position along the axis 122. In such examples, the distance travelled by the carriage 104 from the first linear position to the fourth linear position corresponds to an example third linear displacement 514 along the axis 122, where the third linear displacement 514 is larger than the first linear displacement 510 and/or the second linear displacement 512.

In some examples, the trailer hitch 100 is configured so that the angular displacement between the lever 114 and the axis 122 does not exceed a threshold angle of rotation less than 90 degrees (e.g., 89 degrees). For example, the head 106 can include a travel limiter to limit and/or otherwise restrict rotation of the lever 114 and/or the link 116. Advantageously, limiting rotation of the lever 114 to 89 degrees in each direction with respect to the axis 122 prevents contact between the trailer and the vehicle cab during sharp turns, and can prevent undesired rearward travel of the carriage 104 during straightening out and/or realigning of the trailer with respect to the vehicle (e.g., during completion of a turn). In other examples, the trailer hitch 100 can be configured so that the angular displacement can exceed 89 degrees.

Upon completion of the turn of the vehicle, the trailer becomes substantially realigned with and/or parallel to the axis 122. As such, the trailer hitch 100 returns to the first configuration 502 from the second configuration 504, the third configuration 506, and/or the fourth configuration 508 by rotation of the head clockwise about the third axis 412 until the lever 114 and the link 116 are substantially aligned with and/or parallel to the axis 122. In the illustrated example of FIG. 5, the second configuration 504, the third configuration 506, and/or the fourth configuration 508 correspond to the vehicle making a right turn. Alternatively, in response to the vehicle making a left turn, the lever 114 can rotate clockwise about the third axis 412 from the first configuration 502. In such examples, orientations of the lever 114 and the link 116 in the second configuration 504, the third configuration 506, and/or the fourth configuration 508 are reflected across the axis 122, while values of the angular displacement remain the same regardless of whether the vehicle is making a left turn or a right turn.

FIG. 6 is an example plot 600 illustrating linear displacement (e.g., Δ) of the example carriage 104 of FIGS. 2A, 2B, 2C and/or 2D with respect to angular displacement (e.g., θ) of the example lever 114 of FIGS. 4A and/or 4B. In the illustrated example of FIG. 6, the lever 114 has a length of 11.5 inches and the link 116 has a length of 12 inches. In such examples, a length of the lever 114 is a distance between the second axis 410 and the third axis 412 of FIG. 4B, and a length of the link 116 is a distance between the first axis 408 and the second axis 410 of FIG. 4B. In other examples, a different length for each of the lever 114 and the link 116 may be used. The example plot 600 includes an example horizontal axis 602 corresponding to angular displacement θ (e.g., in degrees) and an example vertical axis 604 corresponding to linear displacement Δ (e.g., in inches). The example plot 600 further includes an example first point 606A corresponding to the first configuration 502, an example second point 606B corresponding to the second configuration 504, an example third point 606C corresponding to the third configuration 506, and an example fourth point 606D corresponding to the fourth configuration 508 of FIG. 5.

At the first configuration 502, the vehicle and the trailer are substantially aligned so that the angular displacement and the linear displacement corresponding to the first point 606A are both zero. At the second configuration 504 corresponding to the second point 606B, the angular displacement of 30 degrees corresponds to a linear displacement of approximately 2.7 inches. At the third configuration 506 corresponding to the third point 606C, the angular displacement of 60 degrees corresponds to a linear displacement of approximately 10 inches. At the fourth configuration 508 corresponding to the fourth point 606D, the angular displacement of 90 degrees corresponds to a linear displacement of approximately 20 inches. In other examples, the linear displacement corresponding to each angular displacement may be different based on the length of the lever 114 and the length of the link 116.

As shown in the example plot 600, a parabolic relationship exists between the angular displacement and the linear displacement of the trailer hitch 100. For example, small changes in linear displacement occur at small values of angular displacement (e.g., less than 20 degrees). In some examples, a large turn radius of the vehicle corresponds to a small value of angular displacement of the trailer hitch 100. Advantageously, the trailer hitch 100 has little to no rearward travel when there is little risk of interference between the vehicle and the trailer (e.g., during wide turns of the vehicle).

Figure 7:
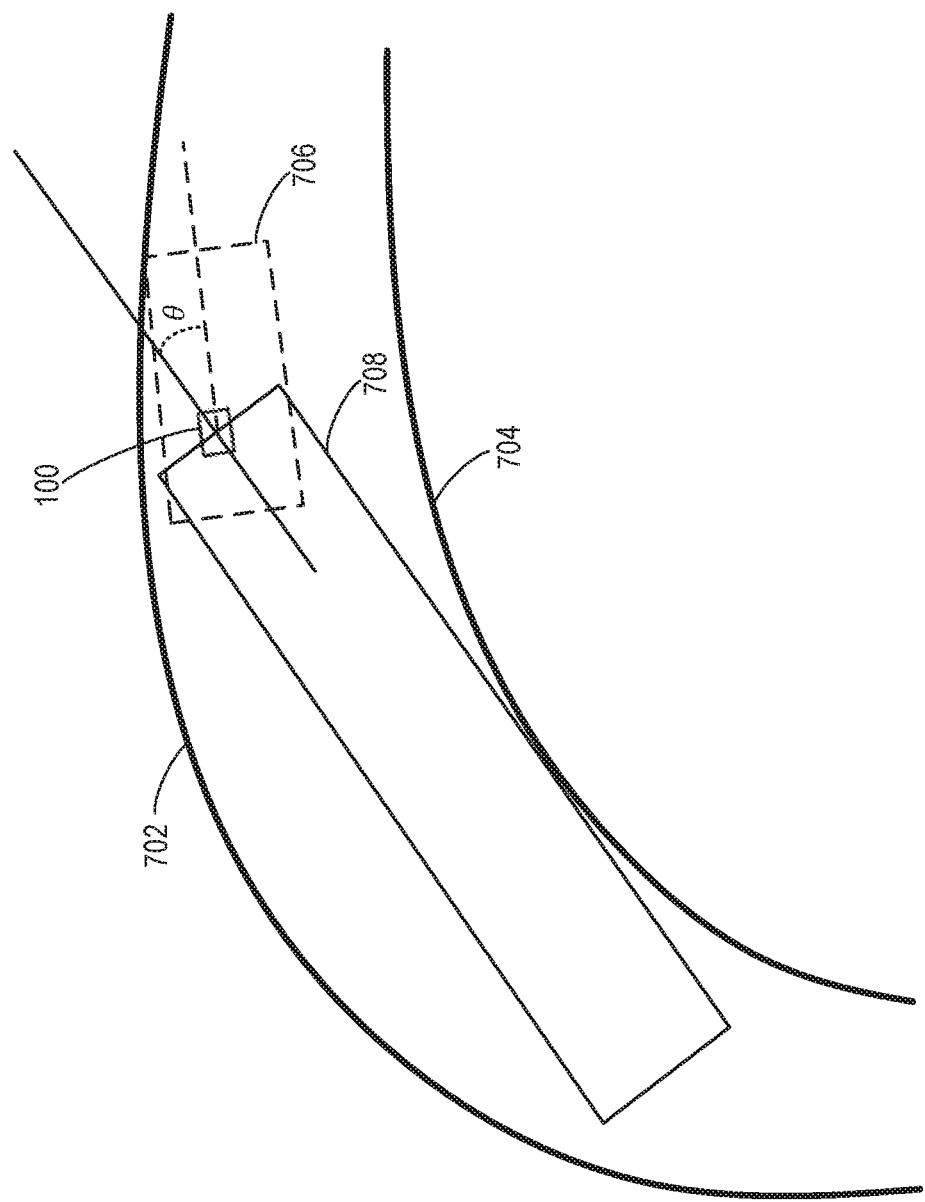
FIG. 7 illustrates travels paths of a vehicle and trailer implementing the example trailer hitch of FIGS. 1A, 1B, 1C, and/or 1D.

FIG. 7 illustrates example travels paths 702, 704 of an example vehicle 706 and an example trailer 708. In the illustrated example of FIG. 7, an example first travel path 702 corresponds to travel of an outside front tire of the example vehicle 706. Furthermore, an example second travel path 704 corresponds to travel of an innermost tire of the example trailer 708. The example vehicle 706 includes the example trailer hitch 100 of FIGS. 1A, 1B, 1C, and/or 1D coupled between the trailer 708 and the vehicle 706.

In the illustrated example of FIG. 7, the vehicle 706 is making a low-speed, 90-degree right turn. Although the vehicle 706 is making a 90-degree turn, the angular displacement between the vehicle 706 and the trailer 708 is approximately 30 degrees. A difference between the turning angle and the angular displacement is a result of rear wheels of the vehicle 706 not matching a travel path of the front wheels of the vehicle 706 during turning. In some examples, the difference between the turning angle and the angular displacement is based on a distance between the front wheels and the rear wheels of the vehicle 706 and/or is based on a turn radius of the vehicle 706.

As described in connection with FIG. 6 above, the trailer hitch 100 exhibits little to no rearward travel during wide turns of the vehicle 706 (e.g., having an angular displacement of less than 20 degrees). Furthermore, the trailer hitch 100 exhibits sufficient travel during sharp turns (e.g., having an angular displacement of greater than 20 degrees) to avoid collision between the vehicle 706 and the trailer 708. In the illustrated example of FIG. 7, the trailer hitch 100 travels rearward approximately 2.7 inches to accommodate the angular displacement of 30 degrees. As such, the first travel path 702 differs from the second travel path 704 due to travel of the trailer hitch 100 and corresponding travel of the trailer 708.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that automatically shift a trailer rearward on a vehicle to avoid collision between the trailer and the vehicle during turning. The disclosed methods, apparatus and articles of manufacture improve the efficiency of a trailer hitch by implementing a linkage to control motion of the trailer hitch, where the linkage is easier to manufacture and is more durable compared to a cam mechanism used in a typical sliding trailer hitch. Furthermore, the disclosed methods, apparatus and articles of manufacture reduce rearward travel of the trailer for small angular displacements to reduce unnecessary wear of the trailer hitch. Accordingly, the disclosed methods, apparatus and articles of manufacture reduce maintenance costs due to increased manufacturability and durability of the trailer hitch.

Example methods, apparatus, systems, and articles of manufacture to automatically shift a trailer rearward on a vehicle are disclosed herein. Further examples and combinations thereof include the following:

Example 1 includes a trailer hitch including a base to be coupled to a vehicle bed of a vehicle, a carriage slidably coupled to the base, the carriage to slide along rails of the base between a first position and a second position, and a head rotatably coupled to the carriage, the carriage to slide from the first position to the second position in response to rotation of the head.

Example 2 includes the trailer hitch of Example 1, and further includes a lever coupled to a column of the head, the lever to rotate with the head, and a link rotatably coupled between the lever and the base, the link coupled to the lever at a first pin joint and coupled to the base at a second pin joint, the second pin joint fixed at the base.

Example 3 includes the trailer hitch of Example 2, where the rotation of the head generates an angular displacement between the lever and the link, the angular displacement corresponding to a distance travelled by the carriage along the rails.

Example 4 includes the trailer hitch of Example 2, and further includes an upper slew ring and a lower slew ring, the column coupled to the carriage via the upper slew ring and the lower slew ring, the upper slew ring to stabilize an upper portion of the column, and the lower slew ring to transmit a load from the head to the carriage.

Example 5 includes the trailer hitch of Example 1, where the first position is proximate a front end of the vehicle bed and the second position is proximate a rear end of the vehicle bed.

Example 6 includes the trailer hitch of Example 1, where a trailer coupled to the head is to move rearward relative to the vehicle and rotate about the vehicle bed in response to turning of the vehicle.

Example 7 includes the trailer hitch of Example 1, wherein the rails are cylindrical, each rail coupled to a plate of the base using one or more support trusses, each support truss including an anchor bushing assembly, the anchor bushing assemblies to fix the base to the vehicle.

Example 8 includes a trailer hitch including a fixed component including cylindrical guides, the fixed component to be coupled to a vehicle bed, a sliding component including arms slidably coupled to the cylindrical guides, the sliding component to slide between a first position and a second position along the cylindrical guides, and a rotating component coupled to the sliding component, the rotating component to slide with and rotate with respect to the sliding component, the sliding component and the rotating component to slide along the fixed component in response to a rotation of the rotating component.

Example 9 includes the trailer hitch of Example 8, and further includes bearings coupled between the arms and the cylindrical guides.

Example 10 includes the trailer hitch of Example 8, where the first position is proximate a front end of the vehicle bed and the second position is proximate a rear end of the vehicle bed.

Example 11 includes the trailer hitch of Example 8, where the cylindrical guides include a first cylindrical guide and a second cylindrical guide, the first cylindrical guide and the second cylindrical guide positioned on opposite sides of the sliding component and parallel with a sliding direction of the sliding component.

Example 12 includes the trailer hitch of Example 11, where the arms include at least two first arms coupled to the first cylindrical guide and at least two second arms coupled to the second cylindrical guide.

Example 13 includes the trailer hitch of Example 8, where the rotating component further includes a pivot beam, the rotating component to pivot with respect to the sliding component.

Example 14 includes the trailer hitch of Example 8, wherein the cylindrical guides are coupled to the fixed component using one or more support trusses, each support truss including an anchor bushing assembly.

Example 15 includes a trailer hitch including a fixed base, a carriage slidably coupled to the fixed base, a head rotatably coupled to the carriage, the carriage to slide along the fixed base in response to a rotation of the head, and a linkage including a link coupled to the fixed base at a first pin joint, and a lever coupled to the link at a second pin joint and further coupled to the head, the rotation of the head to generate an angular displacement between the link and the lever at the second pin joint, the angular displacement corresponding to a distance traveled by the carriage along the fixed base.

Example 16 includes the trailer hitch of Example 15, where the first pin joint is at a fixed position of the fixed base and the second pin joint is movable with respect to the fixed base.

Example 17 includes the trailer hitch of Example 15, where the lever is fixedly coupled to a column of the head, the lever to rotate with the column.

Example 18 includes the trailer hitch of Example 15, where the angular displacement is between a first threshold and a second threshold, the first threshold at 0 degrees, the second threshold less than 90 degrees.

Example 19 includes the trailer hitch of Example 18, where the carriage is at a first position in response to the angular displacement being at the first threshold and at a second position in response to the angular displacement being at the second threshold, the first position proximate a front end of the fixed base, the second position proximate a rear end of the fixed base.

Example 20 includes the trailer hitch of Example 19, where the distance between the first position and the second position corresponds to a first length of the link and a second length of the lever.

Example 21 includes the trailer hitch of Example 15, where the second pin joint is a double lap joint.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A trailer hitch comprising:
   a base to be coupled to a vehicle bed of a vehicle;
   a carriage slidably coupled to the base, the carriage to slide along rails of the base between a first position and a second position;
   a head rotatably coupled to the carriage, the carriage to slide from the first position to the second position in response to rotation of the head;
   a lever rigidly fixed to a column extending from the head toward the base, the lever to rotate with the head and the column; and
   a link rotatably coupled between the lever and the base, the link coupled to the lever at a first pin joint and coupled to the base at a second pin joint.

2. The trailer hitch of claim 1, wherein the second pin joint is fixed at the base.

3. The trailer hitch of claim 1, wherein the rotation of the head generates an angular displacement between the lever and the link, the angular displacement corresponding to a distance travelled by the carriage along the rails.

4. The trailer hitch of claim 1, further including an upper slew ring and a lower slew ring, the column coupled to the carriage via the upper slew ring and the lower slew ring, the upper slew ring to stabilize an upper portion of the column, and the lower slew ring to transmit a load from the head to the carriage.

5. The trailer hitch of claim 1, wherein the first position is proximate a front end of the vehicle bed and the second position is proximate a rear end of the vehicle bed.

6. The trailer hitch of claim 1, wherein a trailer coupled to the head is to move rearward relative to the vehicle and rotate about the vehicle bed in response to turning of the vehicle.

7. The trailer hitch of claim 1, wherein the rails are cylindrical, each rail coupled to a plate of the base using one or more support trusses, each support truss including an anchor bushing assembly, the anchor bushing assemblies to fix the base to the vehicle.

8. A trailer hitch comprising:
   a fixed component including cylindrical guides, the fixed component to be coupled to a vehicle bed;
   a sliding component including arms slidably coupled to the cylindrical guides, the sliding component to slide between a first position and a second position along the cylindrical guides;
   a rotating component coupled to the sliding component, the rotating component to slide with and rotate with respect to the sliding component, the sliding component and the rotating component to slide along the fixed component in response to a rotation of the rotating component;
   a lever fixed to a column extending away from the rotating component, the lever to rotate with the rotating component; and
   a link rotatably coupled between the lever and the fixed component, the link coupled to the lever at a first pin joint and coupled to the fixed component at a second pin joint.

9. The trailer hitch of claim 8, further including bearings coupled between the arms and the cylindrical guides.

10. The trailer hitch of claim 8, wherein the first position is proximate a front end of the vehicle bed and the second position is proximate a rear end of the vehicle bed.

11. The trailer hitch of claim 8, wherein the cylindrical guides include a first cylindrical guide and a second cylindrical guide, the first cylindrical guide and the second cylindrical guide positioned on opposite sides of the sliding component and parallel with a sliding direction of the sliding component.

12. The trailer hitch of claim 11, wherein the arms include at least two first arms coupled to the first cylindrical guide and at least two second arms coupled to the second cylindrical guide.

13. The trailer hitch of claim 8, wherein the rotating component further includes a pivot beam, the rotating component to pivot with respect to the sliding component.

14. The trailer hitch of claim 8, wherein the cylindrical guides are coupled to the fixed component using one or more support trusses, each support truss including an anchor bushing assembly.

15. A trailer hitch comprising:
   a fixed base;
   a carriage slidably coupled to the fixed base;
   a head rotatably coupled to the carriage, the carriage to slide along the fixed base in response to a rotation of the head; and
   a linkage including:
      a link coupled to the fixed base at a first pin joint; and
      a lever coupled to the link at a second pin joint and further coupled to the head, the rotation of the head to generate an angular displacement between the link and the lever at the second pin joint, the angular displacement corresponding to a distance traveled by the carriage along the fixed base.

16. The trailer hitch of claim 15, wherein the first pin joint is at a fixed position of the fixed base and the second pin joint is movable with respect to the fixed base.

17. The trailer hitch of claim 15, wherein the lever is fixedly coupled to a column of the head, the lever to rotate with the column.

18. The trailer hitch of claim 15, wherein the angular displacement is between a first threshold and a second threshold, the first threshold at 0 degrees, the second threshold less than 90 degrees.

19. The trailer hitch of claim 18, wherein the carriage is at a first position in response to the angular displacement being at the first threshold and at a second position in response to the angular displacement being at the second threshold, the first position proximate a front end of the fixed base, the second position proximate a rear end of the fixed base.

20. The trailer hitch of claim 19, wherein the distance between the first position and the second position corresponds to a first length of the link and a second length of the lever.

21. The trailer hitch of claim 15, wherein the second pin joint is a double lap joint.

\* \* \* \* \*